US012763966B1

(12) United States Patent
Shub

(10) Patent No.: US 12,763,966 B1
(45) Date of Patent: Oct. 13, 2026

(54) METHOD AND SYSTEM FOR BROWSER-BASED PROCESSING OF ENCRYPTED DOCUMENTS WITH PARAGRAPH-AWARE SEGMENTATION AND CRYPTOGRAPHIC AUDIT TRAIL GENERATION

(71) Applicant: Particular Ltd, Raanana (IL)

(72) Inventor: Arnon Shub, Raanana (IL)

(73) Assignee: Particular Ltd

( * ) Notice: Subject to any disclaimer, the term of this patent is extended or adjusted under 35 U.S.C. 154(b) by 0 days.

(21) Appl. No.: 19/428,113

(22) Filed: Dec. 20, 2025

Related U.S. Application Data

(60) Provisional application No. 63/866,993, filed on Aug. 19, 2025.

(51) Int. Cl.
*H04L 9/32* (2006.01)
*G06F 21/62* (2013.01)
(Continued)

(52) U.S. Cl.
CPC ........ *H04L 9/3242* (2013.01); *G06F 21/6245* (2013.01); *G06F 21/78* (2013.01);
(Continued)

(58) Field of Classification Search
None
See application file for complete search history.

(56) References Cited

U.S. PATENT DOCUMENTS 8,707,164 B2 4/2014 Adler et al.
9,679,276 B1 6/2017 Cuende
(Continued)

FOREIGN PATENT DOCUMENTS

CN 102004724 B 6/2012

OTHER PUBLICATIONS

Devlin et al., BERT: Pre-training of Deep Bidirectional Transformers for Language Understanding, arXiv:1810.04805, Oct. 2018, https://arxiv.org/abs/1810.04805.
(Continued)

*Primary Examiner* — William J. Goodchild
(74) *Attorney, Agent, or Firm* — Dhiraj Jindal; PATENT YOGI LLC

(57) ABSTRACT

A method and system for processing encrypted documents using artificial intelligence within web browser environments while maintaining end-to-end encryption boundaries. The system decrypts documents in isolated browser memory, extracts text using multi-pass paragraph-aware segmentation comprising visual, linguistic, semantic, and domain-specific analysis passes with aggregator and voting logic for boundary determination, processes content through domain-specific AI modules with quantized neural network weights, and generates cryptographic audit trails using chained hashing. Security measures include side-channel attack mitigation and cryptographic memory clearing with verification. The paragraph-aware segmentation algorithm preserves semantic coherence across processing boundaries, improving accuracy compared to naive chunking methods. The system supports legal, medical, and financial document processing using domain-optimized BERT variants executing via WebAssembly with optional WebGPU acceleration, all within browser boundaries without server communication.

18 Claims, 11 Drawing Sheets

(51) Int. Cl.
*G06F 21/78* (2013.01)
*G06N 3/0495* (2023.01)
*G06N 3/0499* (2023.01)
*H04L 9/00* (2022.01)

(52) U.S. Cl.
CPC ......... *G06N 3/0495* (2023.01); *G06N 3/0499* (2023.01); *H04L 9/50* (2022.05)

(56) References Cited

U.S. PATENT DOCUMENTS

| | | | | |
|---|---|---|---|---|
| 9,906,369 | B2 | 2/2018 | Lester et al. | |
| 11,978,273 | B1 | 5/2024 | Ramaswamy et al. | |
| 2012/0143626 | A1* | 6/2012 | Jacobus | G16H 10/60 705/3 |
| 2016/0285948 | A1* | 9/2016 | Saint-Hilaire | G06F 16/958 |
| 2018/0101726 | A1 | 4/2018 | Wang et al. | |
| 2022/0318315 | A1 | 10/2022 | Wyle et al. | |

OTHER PUBLICATIONS

Lee et al., BioBERT: a pre-trained biomedical language representation model for biomedical text mining, Bioinformatics, vol. 36, Issue 4, Feb. 2020, pp. 1234-1240, https://academic.oup.com/bioinformatics/article/36/4/1234/5566506.
Dogu Araci, FinBERT: Financial Sentiment Analysis with Pre-trained Language Models, arXiv:1908.10063, Aug. 2019, https://arxiv.org/abs/1908.10063.
Chalkidis et al, LEGAL-BERT: The Muppets straight out of Law School, arXiv:2010.02559, Oct. 2020, https://arxiv.org/abs/2010.02559.
Haas et al., Bringing the web up to speed with WebAssembly, PLDI 2017, ACM, pp. 185-200, https://dl.acm.org/doi/10.1145/3062341.3062363.
Smilkov et al., TensorFlow.js: Machine Learning for the Web and Beyond, arXiv:1901.05350, Feb. 2019, https://arxiv.org/abs/1901.05350.
W3C, WebGPU, W3C Working Draft, https://www.w3.org/TR/webgpu/, 2024.
ONNX Runtime Web, Microsoft, Run ONNX models in the browser, 2023, https://github.com/microsoft/onnxruntime.
PDF.js, Mozilla, A PDF Reader in JavaScript, 2023, https://mozilla.github.io/pdf.js/.
Tesseract.js, Pure Javascript OCR for more than 100 Languages, 2023, https://tesseract.projectnaptha.com/.
Geng et al., Text segmentation for patent claim simplification via Bidirectional Long-Short Term Memory and Conditional Random Field, Wiley, May 2021, https://onlinelibrary.wiley.com/doi/abs/10.1111/coin.12455.
Jacob et al., Quantization and Training of Neural Networks for Efficient Integer-Arithmetic-Only Inference, CVPR 2018, pp. 2704-2713, https://openaccess.thecvf.com/content_cvpr_2018/papers/Jacob_Quantization_and_Training_CVPR_2018_paper.pdf.
Micikevicius et al., Mixed Precision Training, ICLR 2018, arXiv:1710.03740, https://arxiv.org/abs/1710.03740.
Wu et al., Integer Quantization for Deep Learning Inference: Principles and Empirical Evaluation, arXiv:2004.09602, Apr. 2020, https://arxiv.org/abs/2004.09602.
Mawaldi et al., AWACopilot: A Secure On-Premise Large Language Model-Based Solution for Enhanced Patent Drafting, CEUR Workshop Proceedings, vol. 4062, 2025, https://ceur-ws.org/Vol-4062/paper1.pdf.

* cited by examiner

METHOD AND SYSTEM FOR BROWSER-BASED PROCESSING OF ENCRYPTED DOCUMENTS WITH PARAGRAPH-AWARE SEGMENTATION AND CRYPTOGRAPHIC AUDIT TRAIL GENERATION

CROSS-REFERENCE TO RELATED APPLICATIONS

This application claims the benefit of U.S. Provisional Application No. 63/866,993, filed Aug. 19, 2025, the entire contents of which are incorporated herein by reference.

FIELD OF THE INVENTION

The present invention relates to secure document processing systems, and more particularly to methods and systems for processing encrypted documents within web browser environments while maintaining end-to-end encryption boundaries through paragraph-aware segmentation algorithms and generating cryptographic audit trails.

BACKGROUND OF THE INVENTION

Organizations handling sensitive documents face a fundamental technical challenge: leveraging artificial intelligence capabilities for document analysis while maintaining strict confidentiality through end-to-end encryption. Current systems require documents to be uploaded to cloud servers for processing, breaking encryption boundaries, and exposing sensitive content to potential security vulnerabilities.

Existing approaches have significant technical limitations. Server-side processing requires decryption outside user control, creating security vulnerabilities. Homomorphic encryption enables computation on encrypted data, but incurs substantial computational overhead, making it impractical for real-time document analysis. Trusted Execution Environments (TEEs) require specialized hardware infrastructure and remain vulnerable to various side-channel attacks.

Additional technical constraints have prevented practical implementation of browser-based encrypted document processing systems: Modern NLP models require 100-200 MB of memory; Optical Character Recognition processing requires 10-30 seconds per page for scanned documents; Browser memory limitations restrict processing of large documents; WebAssembly has performance penalties compared to native code execution.

There exists a need in the art for a system and method that enables secure document processing with artificial intelligence capabilities while maintaining complete client-side encryption boundaries without requiring server-side decryption.

SUMMARY OF THE INVENTION

The present invention provides a method and system that processes encrypted documents within web browser environments while maintaining end-to-end encryption boundaries through paragraph-aware segmentation that improves AI model accuracy compared to naive chunking methods.

In accordance with one embodiment, the invention comprises: decrypting encrypted documents within browser memory using isolated memory allocation; extracting text using paragraph-aware segmentation with multi-pass boundary detection; processing extracted text through domain-specific artificial intelligence processing modules; generating cryptographic audit trails using chained hashing; and re-encrypting processed results before persistence or transmission.

The system employs dual-mode text extraction, utilizing native PDF text layers when available and falling back to OCR processing when necessary. The paragraph-aware chunking system maintains context across document segments through overlapping windows and semantic coherence measurements.

In another embodiment, the invention provides quantized AI models optimized for browser execution using WebAssembly and WebGPU acceleration, enabling real-time document analysis without server communication. The system architecture is domain-agnostic, with the same encrypted browser-native processing pipeline, document processor, analysis module, and cryptographic audit trail applicable to legal, medical, financial, and other specialized document processing domains by substituting domain-specific AI models (including encoder-based classification models and generative language models), inference prompts, and processing rules.

DETAILED DESCRIPTION OF THE INVENTION

Glossary of Terms and Acronyms

Figure 1:
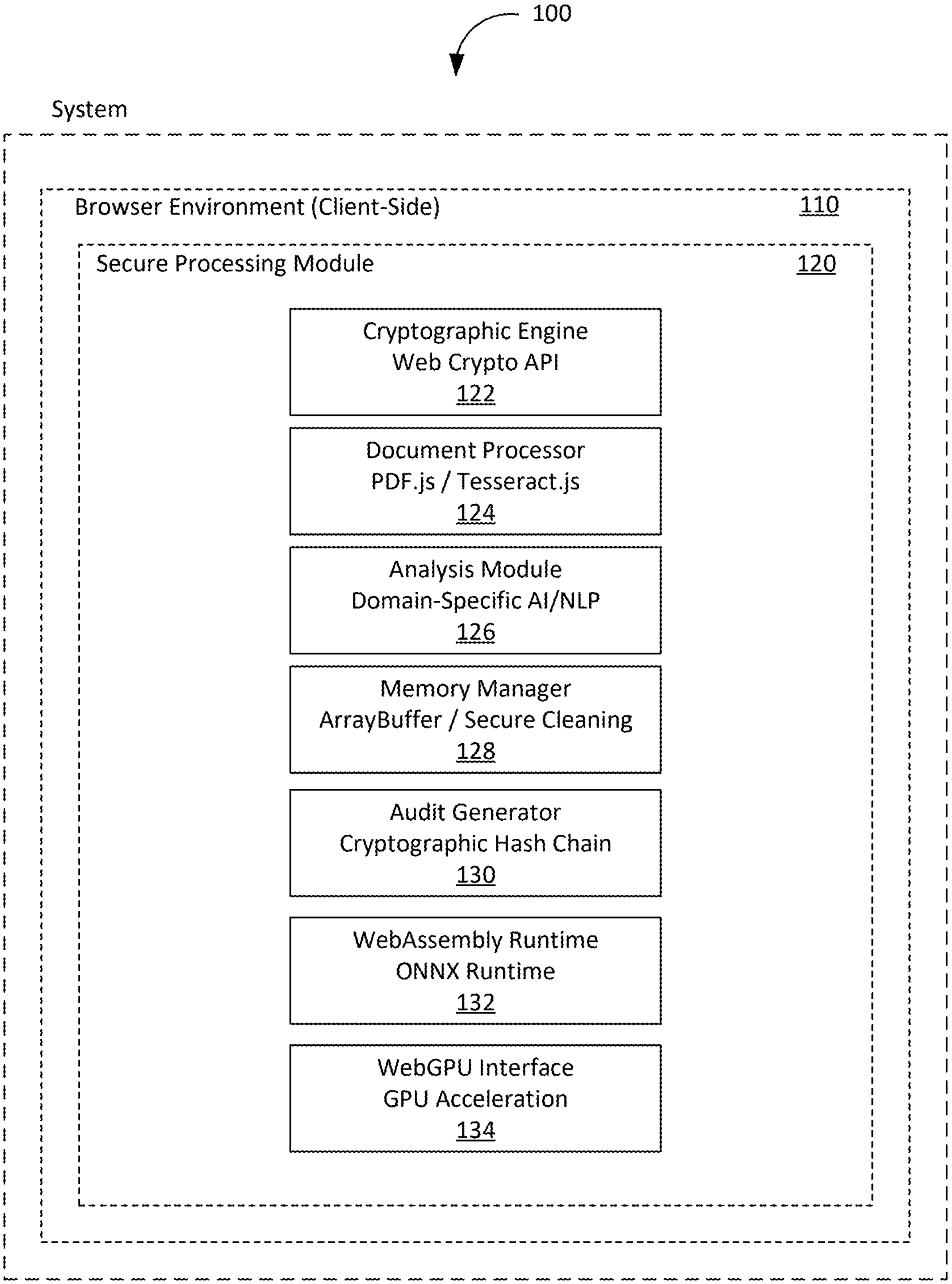
FIG. 1 illustrates an overall system architecture 100 showing a browser environment 110 with a Secure Processing Module 120 containing a cryptographic engine 122, a document processor 124, an analysis module 126, a memory manager 128, an audit generator 130, a WebAssembly runtime 132, and a WebGPU interface 134, in accordance with some embodiments.

The following terms and acronyms are used throughout the detailed description:

AI—Artificial Intelligence
NLP—Natural Language Processing
OCR—Optical Character Recognition
PDF—Portable Document Format
CPU—Central Processing Unit
GPU—Graphics Processing Unit
API/APIs—Application Programming Interface
Web Crypto API—Web Cryptography API (browser API for cryptographic operations)
WebAssembly—Binary instruction format/portable compilation target for running high-performance code in web browsers
WebGPU—Web Graphics API exposing GPU acceleration to web applications
ONNX—Open Neural Network Exchange (model format/ecosystem for interoperable ML models)
FP32—32-bit Floating-Point (single-precision) numeric format
FP16—16-bit Floating-Point (half-precision) numeric format
INT8—8-bit Integer numeric format
BERT—Bidirectional Encoder Representations from Transformers
LegalBERT—BERT-family model variant tuned for legal-domain text (e.g., contracts)
BioBERT—BERT-family model variant tuned for biomedical-domain text
ClinicalBERT—BERT-family model variant tuned for clinical/medical text
FinBERT—BERT-family model variant tuned for financial-domain text
NER—Named Entity Recognition
SOAP—Subjective, Objective, Assessment, Plan
HMAC—Hash-based Message Authentication Code
SHA—Secure Hash Algorithm
SHA-256—Secure Hash Algorithm 256-bit
HMAC-SHA256—HMAC using SHA-256 as the underlying hash function
PWA—Progressive Web Application
JS—JavaScript
IndexedDB—Indexed Database API System Architecture Referring to FIG. 1, a system 100 comprises a browser environment 110 executing within client-side boundaries. The browser environment contains a Secure Processing Module 120 integrating components for document processing while maintaining encryption. The Secure Processing Module 120 includes: a Cryptographic Engine 122 that manages encryption/decryption operations using the Web Crypto API; a Document Processor 124 that handles PDF parsing and text extraction; an Analysis Module 126 that executes domain-specific artificial intelligence processing; a Memory Manager 128 that implements secure memory allocation and clearing; an Audit Generator 130 that creates cryptographic proof of processing; a WebAssembly Runtime 132 that provides optimized performance for AI inference; and a WebGPU Interface 134 that enables GPU acceleration when available.

Document Processing Pipeline

Figure 2:
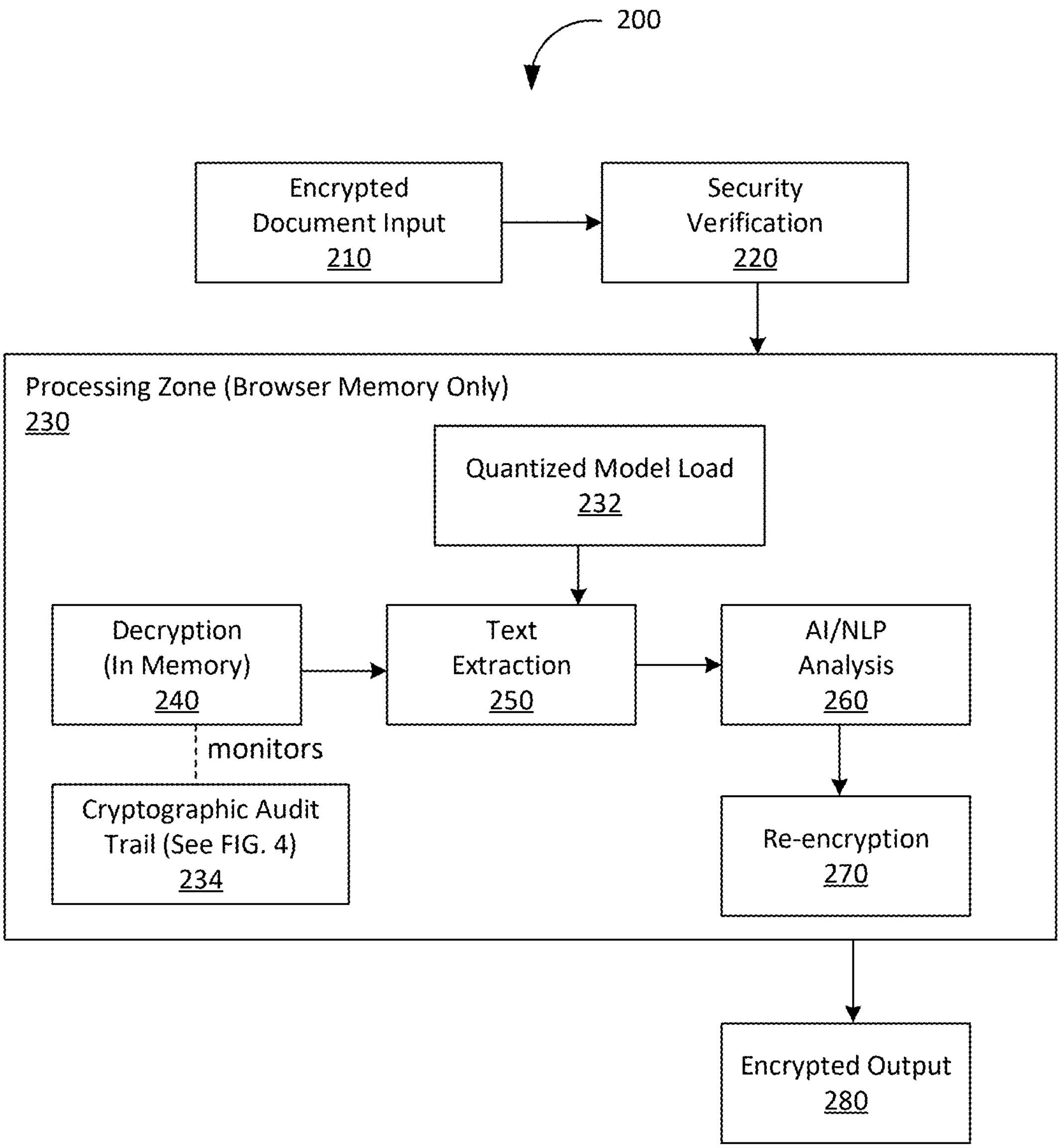
FIG. 2 depicts a document processing pipeline 200 from encrypted input 210 through security verification 220, into a processing zone 230 containing quantized model load 232, decryption 240, text extraction 250, AI/NLP analysis 260, cryptographic audit trail 234, and re-encryption 270, to encrypted output 280, in accordance with some embodiments.

FIG. 2 illustrates a document processing pipeline 200. Documents enter as Encrypted Input 210, undergo Security Verification 220, and enter the Processing Zone 230. Within the Processing Zone, the system performs a Quantized Model Load 232 to prepare AI resources, followed by Decryption 240, Text Extraction 250, and AI-based Analysis 260. A Cryptographic Audit Trail component 234 monitors these operations. Finally, the system performs Re-encryption 270 before generating Encrypted Output 280.

The pipeline maintains encryption boundaries throughout processing. Decrypted content exists only within browser memory for the duration of processing. All operations are complete within a single browser session without server communication.

Text Extraction and Paragraph Segmentation

Figure 3A:
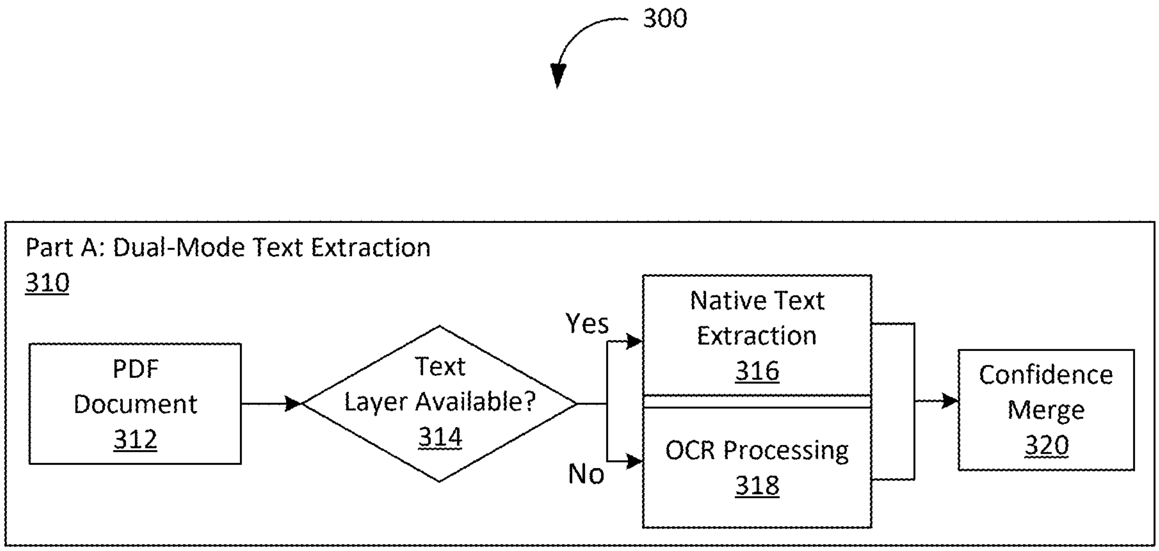
FIGS. 3A, 3B, and 3C show a paragraph-aware segmentation system 300 including dual-mode text extraction 310 with PDF document input 312, text layer decision 314, native text extraction 316, OCR processing 318, and confidence-based merge 320; the multi-pass segmentation module 330 with four analysis passes (331-334), the aggregator and voting logic 335, and domain-specific AI processing 340, in accordance with some embodiments.
Figure 3B:
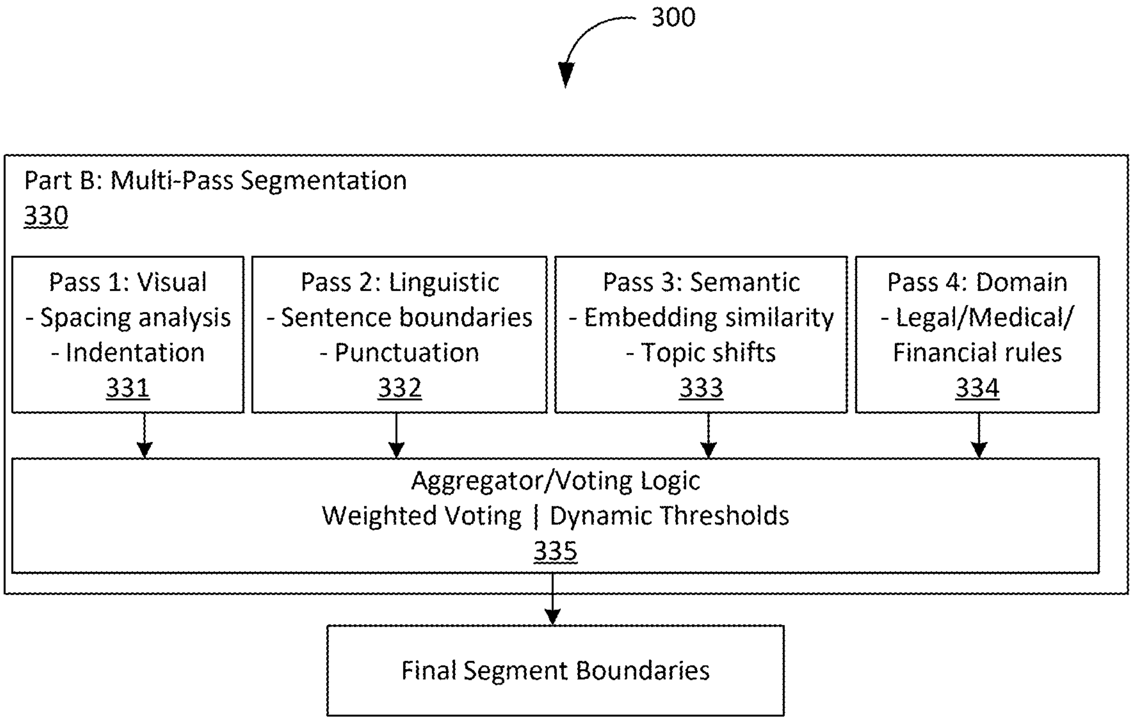
Figure 3C:
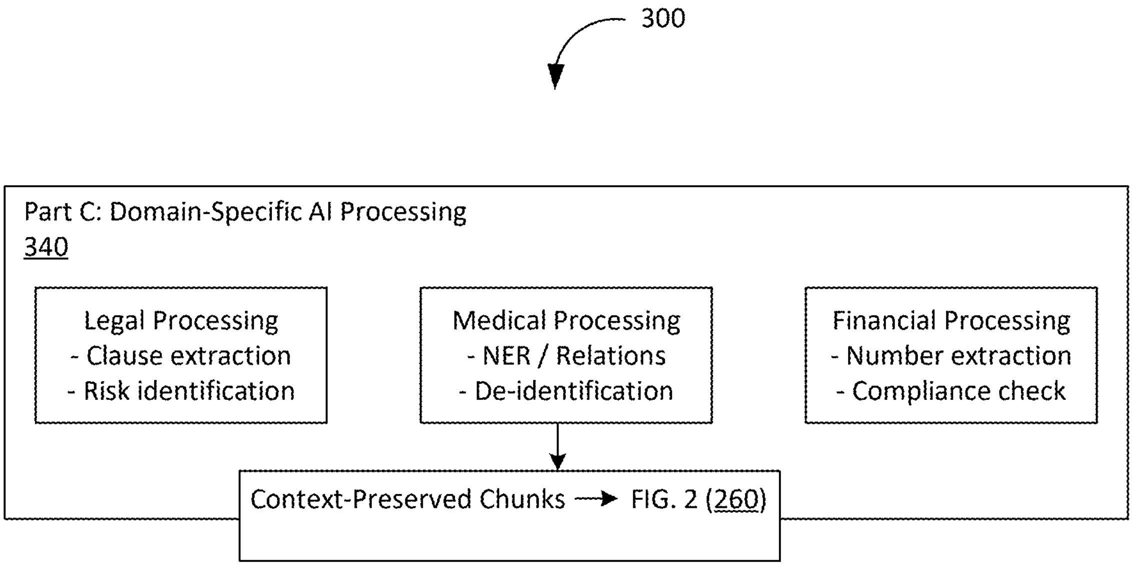

FIGS. 3A, 3B, and 3C detail a dual-mode text extraction system 300. A PDF Document 312 enters the system and is evaluated at decision point 314 to determine text layer availability. When text layers are available, the system performs Native Text Extraction 316 from PDF text layers. When text layers are unavailable or incomplete, the system employs OCR Processing 318 using WebAssembly-compiled Tesseract. Results from both paths are combined at a Confidence-Based Merge module 320. The Paragraph Segmentation Module 330 maintains semantic boundaries across both extraction modes.

The paragraph segmentation algorithm employs a multi-pass approach comprising four distinct analysis phases: Pass 1 (Visual) 331, Pass 2 (Linguistic) 332, Pass 3 (Semantic) 333, and Pass 4 (Domain) 334. Results are aggregated by the Aggregator and Voting Logic 335 to determine Final Segment Boundaries:

Pass 1 (Visual) 331: The system analyzes vertical spacing between text blocks, identifying gaps exceeding a configurable threshold relative to line height (e.g., 1.2×-2.0×) as potential paragraph boundaries. The algorithm detects indentation changes and recognizes font size variations as boundary indicators.

Pass 2 (Linguistic) 332: The system applies NLP heuristics to identify sentence completion patterns, detects punctuation patterns indicating paragraph ends, and recognizes numbered lists and bullet points as distinct segments.

Pass 3 (Semantic) 333: Using a sliding window approach with similarity metrics, the system employs embeddings for context comparison and calculates similarity thresholds dynamically based on document characteristics.

Pass 4 (Domain) 334: The system applies specialized patterns including legal document patterns (section numbering, clause structures), medical patterns (SOAP notes, diagnostic sections), and financial patterns (tables, numerical sequences).

The Aggregator and Voting Logic component 335 receives boundary candidates from all four passes and applies weighted voting to determine final segment boundaries. Confidence scores are computed using weighted contributions from each pass, with dynamic threshold adjustment based on detected document type and content characteristics. The system then directs content to Domain-Specific AI Processing modules 340, which are optimized for legal, medical, or financial contexts.

AI Model Quantization

Figure 5:
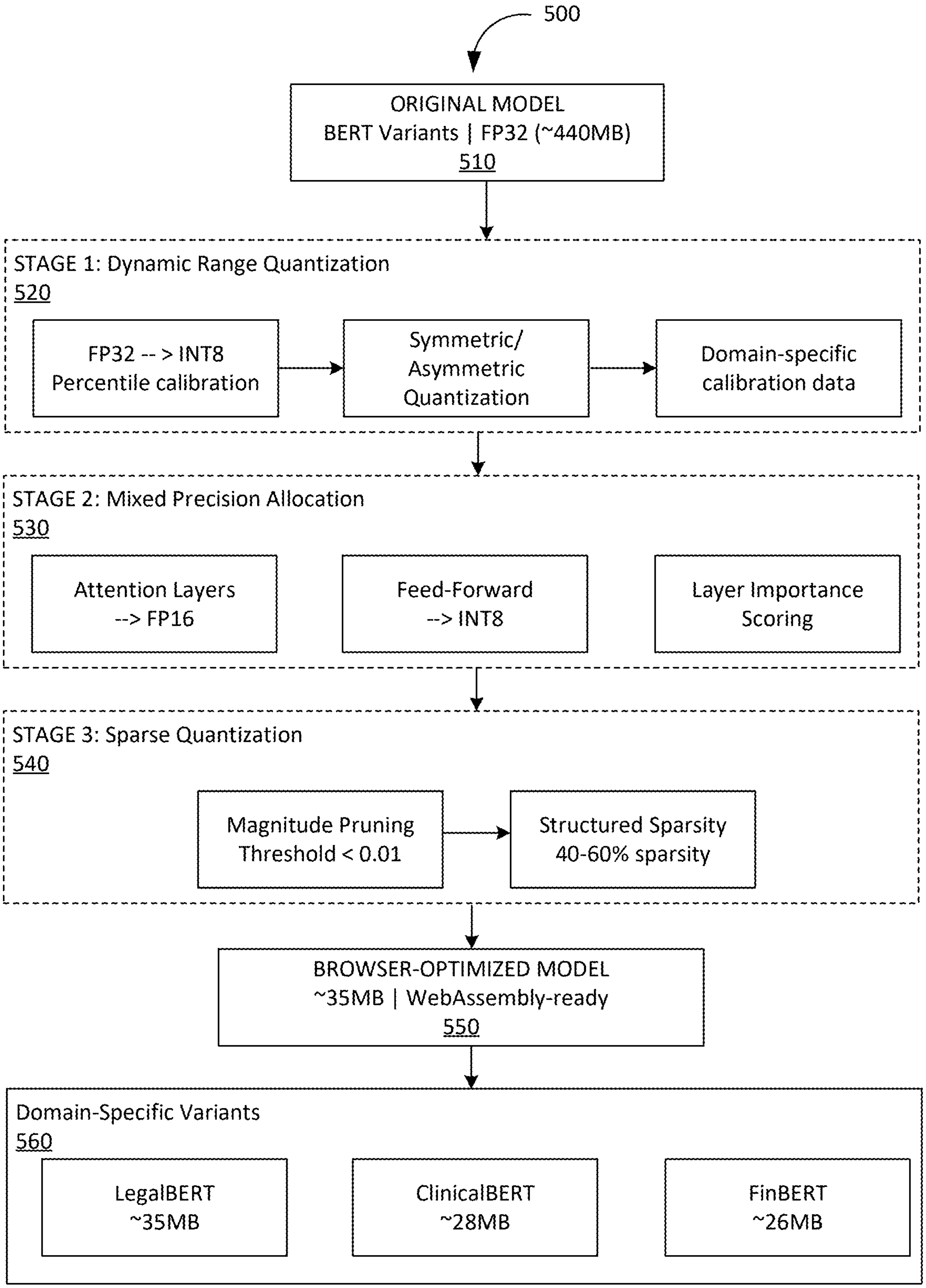
FIG. 5 depicts an exemplary AI model quantization pipeline 500 showing transformation from original model 510 through stage 1 (520), stage 2 (530), and stage 3 (540) to produce browser-optimized model 550 and domain-specific variants 560, in accordance with some embodiments.

FIG. 5 illustrates an exemplary quantization pipeline 500 for model compression enabling browser execution. The pipeline transforms an Original Model 510 through multiple stages to produce a Browser-Optimized Model 550. The system implements the following quantization strategies:

Stage 1—Dynamic Range Quantization 520: The system converts FP32 weights to INT8 representation using percentile-based calibration, implementing both symmetric and asymmetric quantization based on weight distribution analysis. Calibration is performed using a representative dataset of domain-specific documents (e.g., legal contracts, medical records, or financial statements) to ensure activation distributions match real-world usage patterns.

Stage 2—Mixed Precision Allocation 530: The system maintains FP16 precision for attention layers while using INT8 for feed-forward networks, allocating precision based on layer importance scores determined during calibration.

Stage 3—Sparse Quantization 540: The system applies magnitude-based pruning, removing weights below a calculated threshold while maintaining structured sparsity patterns for efficient inference. The resulting Browser-Optimized Model 550 can be instantiated as Exemplary Domain-Specific Variants 560, such as LegalBERT (contract analysis), ClinicalBERT (medical NER), or FinBERT (financial analysis).

Domain-Specific Processing Modules

The system implements domain-specific AI processing modules optimized for different document types:

Legal Document Processing: The system employs BERT-based models fine-tuned on legal corpora, implementing clause extraction, contract analysis, obligation detection, risk identification, and cross-reference resolution.

Medical Document Processing: The system utilizes BioBERT/ClinicalBERT variants optimized for medical text, performing named entity recognition, temporal relation extraction, de-identification, and code suggestion.

Financial Document Processing: The system deploys FinBERT models for financial analysis, executing numerical extraction, sentiment analysis, risk identification, and compliance checking.

Security Implementation

Figure 6A:
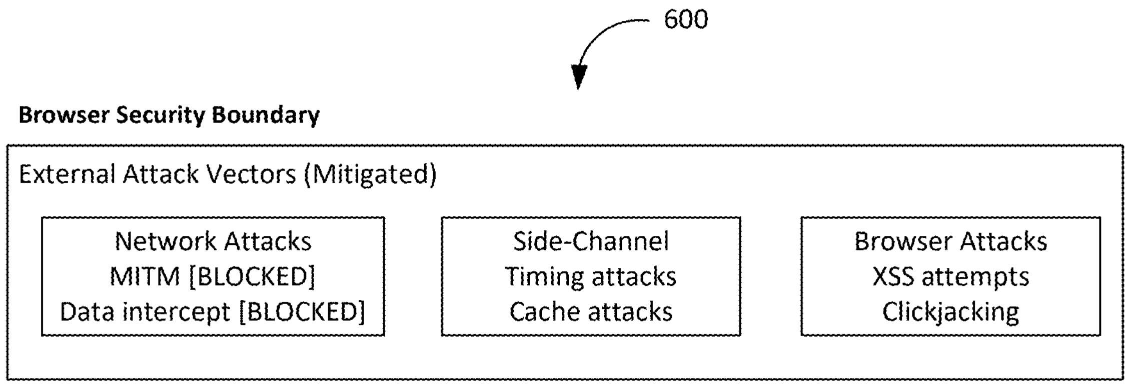
FIGS. 6A, 6B, and 6C show an exemplary threat model and security boundaries 600, illustrating the isolation mechanisms between browser memory, local storage, and external network communications, in accordance with some embodiments.
Figure 6B:
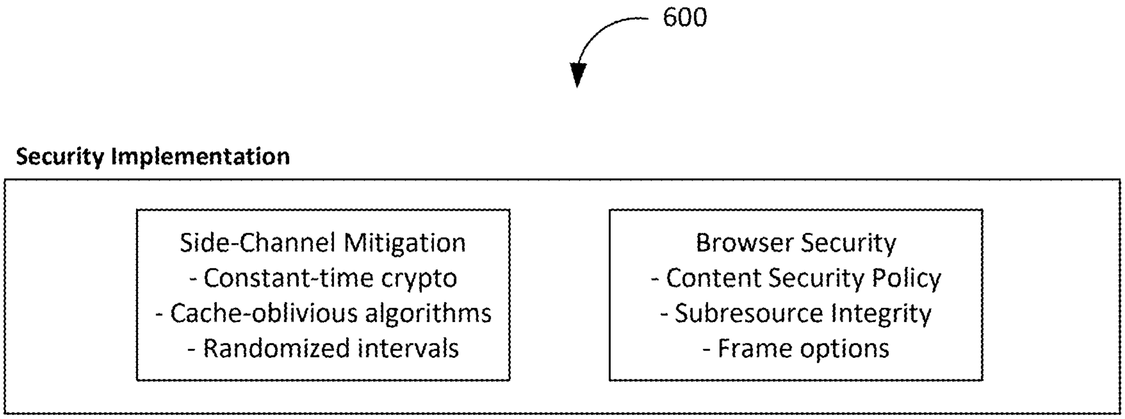
Figure 6C:
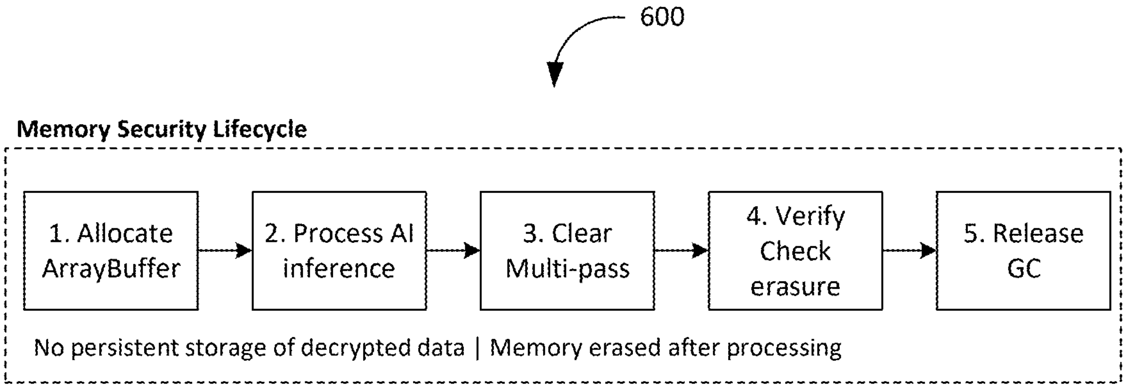

The system implements comprehensive security measures as shown in the Threat Model 600 of FIGS. 6A, 6B, and 6C. These include: Side-Channel Mitigation through constant-time operations for cryptographic functions, cache-oblivious algorithms, and randomized computation intervals; Browser Security through Content Security Policy enforcement, Subresource Integrity validation, frame options for clickjacking prevention, and fingerprinting resistance measures.

Memory Management

The system implements secure memory management using ArrayBuffer objects that provide isolated memory regions. The memory lifecycle comprises: Allocation of isolated ArrayBuffer objects; Usage within isolation boundaries; Clearing through multi-pass cryptographic overwrite; Verification of complete erasure; and Deallocation of memory resources.

Cryptographic Audit Trail

Figure 4A:
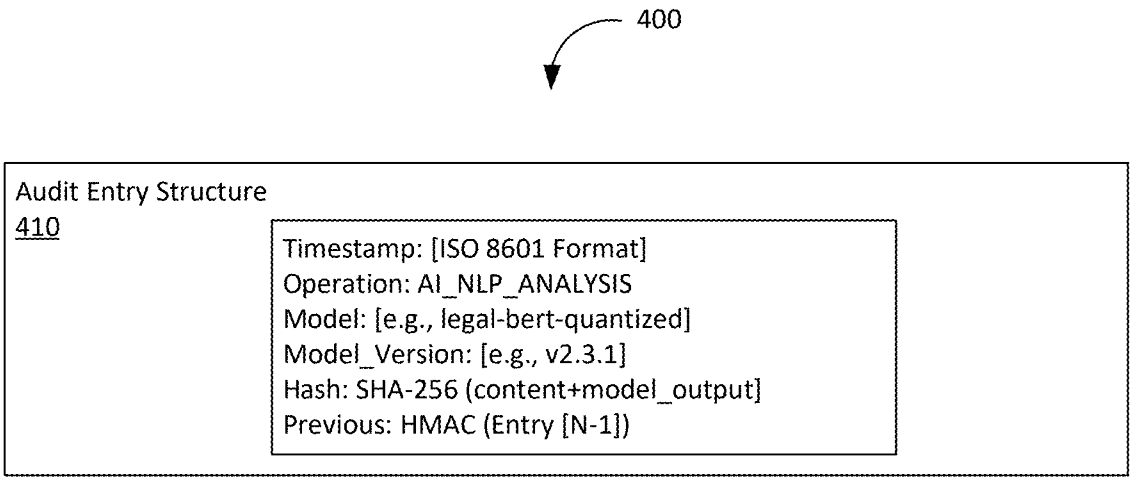
FIGS. 4A and 4B illustrate a cryptographic audit trail system 400 including an audit entry structure 410 and a cryptographic hash chaining mechanism 450, in accordance with some embodiments.
Figure 4B:
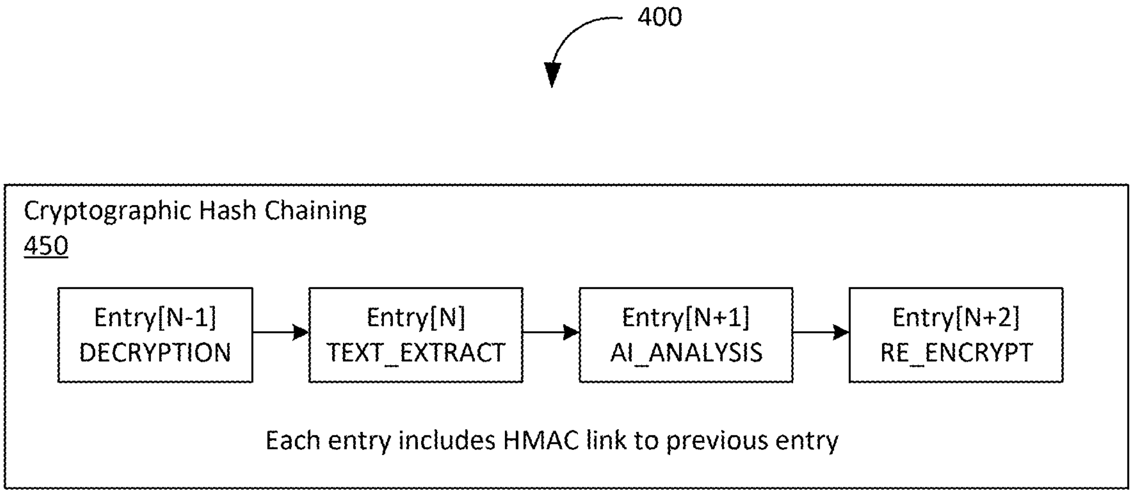

FIGS. 4A and 4B illustrate an audit trail system 400. An Audit Entry Structure 410 is generated for each processing operation, containing a timestamp, operation type identifier, input/output hashes, and a cryptographic hash. These entries are linked via a Cryptographic Hash Chaining Mechanism 450 using a cryptographic hashing algorithm (such as HMAC-SHA256), creating a tamper-evident log of all processing activities. Followings are the properties associated with the audit trail system 400:

Immutability: Modifications invalidate subsequent entries

AI Transparency: Record of model processing activities

Regulatory Compliance: Verifiable processing audit trail

Performance Characteristics

The system achieves the following performance characteristics: 50-page documents process in approximately 25-30 seconds on representative hardware configurations; Peak memory usage of approximately 150-200 MB; Progressive processing support for documents exceeding browser memory constraints; Full operation within browser memory limitations without external storage requirements.

Implementation Technologies

The system utilizes: Web Crypto API for cryptographic operations; PDF.js or equivalent for document parsing; Tesseract.js compiled to WebAssembly for OCR; ONNX Runtime Web or equivalent for AI inference; and IndexedDB with encryption for local persistent storage. The system operates on modern web browsers supporting WebAssembly and Web Crypto API standards.

What is claimed is:

1. A method for processing encrypted documents within a web browser, the method comprising:

a) decrypting encrypted document data within browser memory using isolated memory allocation;

b) extracting text content using paragraph-aware segmentation with multi-pass boundary detection comprising visual analysis, linguistic analysis, semantic coherence measurement, and domain-specific rule application;

c) aggregating boundary candidates from said multi-pass boundary detection using weighted voting to determine final segment boundaries;

d) analyzing the extracted text using domain-specific artificial intelligence processing modules executed within a browser environment;

e) generating a cryptographic audit trail of processing operations using chained hash entries; and f) re-encrypting processed results before persistence or transmission;

wherein all operations maintain encryption boundaries within the web browser, and no decrypted content is transmitted to external servers.

2. The method of claim 1, wherein the paragraph-aware segmentation comprises: a first pass performing visual analysis detecting spacing patterns exceeding a configurable threshold relative to line height and indentation changes; a second pass performing linguistic analysis identifying sentence boundaries and punctuation patterns; a third pass measuring semantic coherence using embedding similarity metrics with dynamic thresholds; and a fourth pass applying domain-specific rules for legal, medical, or financial document structures.

3. The method of claim 1, wherein the text extraction employs dual-mode processing comprising: primary extraction from native PDF text layers; secondary extraction using optical character recognition when text layers are unavailable; and a merge strategy optimizing content for Artificial Intelligence (AI) model input.

4. The method of claim 3, wherein the dual-mode extraction includes confidence scoring with dynamic threshold adjustment based on extraction quality metrics.

5. The method of claim 1, wherein the domain-specific artificial intelligence processing modules comprise neural network models with quantized weights converted from FP32 to INT8 and FP16 formats for browser execution.

6. The method of claim 5, wherein the model quantization comprises dynamic range quantization using percentile-based calibration on domain-specific document datasets, mixed precision maintaining FP16 for attention layers and INT8 for feed-forward networks, and sparse quantization with magnitude-based pruning.

7. The method of claim 1, wherein the isolated memory allocation comprises ArrayBuffer objects with cryptographic clearing after processing through multi-pass overwrite with verification.

8. The method of claim 1, wherein the cryptographic audit trail comprises chained entries using a cryptographic hashing algorithm, each entry including a timestamp, operation type identifier, and cryptographic hash of operation inputs and outputs.

9. The method of claim 8, wherein said cryptographic hashing algorithm is Hash-based Message Authentication Code using Secure Hash Algorithm-256 (HMAC-SHA256) or an equivalent keyed-hash message authentication code.

10. The method of claim 1, wherein the domain-specific artificial intelligence processing comprises legal document processing using Bidirectional Encoder Representations from Transformers (BERT)-based models fine-tuned on legal corpora for clause extraction, obligation detection, and risk identification.

11. The method of claim 1, wherein the domain-specific artificial intelligence processing comprises medical document processing using BioBERT/ClinicalBERT variants for named entity recognition, temporal relation extraction, and de-identification.

12. The method of claim 1, wherein the domain-specific artificial intelligence processing comprises financial document processing using FinBERT models for numerical extraction, sentiment analysis, and compliance checking.

13. The method of claim 1, wherein all processing occurs within a single browser session without requiring server communication for document analysis.

14. The method of claim 1, further comprising WebAssembly-based inference for executing AI models within the browser environment.

15. The method of claim 1, further comprising Web Graphics Processing Unit (WebGPU) acceleration for parallel processing of Artificial Intelligence (AI) model inference when Graphics Processing Unit (GPU) hardware is available.

16. The method of claim 1, further comprising progressive document processing for handling documents exceeding browser memory constraints by segmenting processing into sequential batches.

17. The method of claim 1, wherein the method comprises:

(a) dual-mode text extraction with primary native Portable Document Format (PDF) extraction and secondary Optical Character Recognition (OCR) processing with confidence-based merging;

(b) multi-pass paragraph boundary detection using visual, linguistic, semantic, and domain-specific analysis with weighted voting aggregation;

(c) domain-specific Artificial Intelligence (AI) inference executed via WebAssembly with optional Web Graphics Processing Unit (WebGPU) acceleration;

(d) cryptographic audit trail with Hash-based Message Authentication Code using Secure Hash Algorithm-256 (HMAC-SHA256) chained entries; and (e) complete browser-contained execution without server communication;

wherein the method enables end-to-end encrypted document processing with Artificial Intelligence (AI) analysis entirely within client-side browser memory.

18. The method of claim 1, further comprising progressive document processing that segments documents exceeding browser memory constraints into sequential batches with context preservation, combined with offline operation as a Progressive Web Application maintaining persistent local encryption state via IndexedDB, wherein the combination enables processing of large documents in bandwidth-constrained environments while preserving encrypted processing state across sessions.

* * * * *